United States Patent [19]

Kelsey et al.

[11] 4,184,017

[45] Jan. 15, 1980

[54] POLYVALENT METAL ANODE CONTAINING CELLS

[75] Inventors: G. Stephen Kelsey, Tyngsboro; Arabinda N. Dey, Needham; Per Bro, Andover, all of Mass.

[73] Assignee: P. R. Mallory & Co. Inc., Indianapolis, Ind.

[21] Appl. No.: 6,051

[22] Filed: Jan. 24, 1979

[51] Int. Cl.$^2$ .............................................. H01M 6/16
[52] U.S. Cl. ...................................... 429/197; 429/198
[58] Field of Search ....................... 429/194, 197, 198

[56] References Cited

U.S. PATENT DOCUMENTS

| | | | |
|---|---|---|---|
| 1,357,160 | 10/1920 | French | 429/198 |
| 3,544,385 | 12/1970 | Newman | 136/155 |
| 4,069,374 | 1/1978 | Gabano | 429/197 |
| 4,142,028 | 2/1979 | Leger et al. | 429/194 |

*Primary Examiner*—Donald L. Walton
*Attorney, Agent, or Firm*—Ronald S. Cornell; Israel Nissenbaum; Martin M. Glazer

[57] ABSTRACT

An electrochemical cell containing a polyvalent film forming metal anode, a nucleophilic non-aqueous electrolyte solvent and a free radical forming carbon halide additive dissolved in said solvent.

10 Claims, No Drawings

POLYVALENT METAL ANODE CONTAINING CELLS

This invention relates to electrochemical cells containing polyvalent film forming metal anodes and non-aqueous electrolytes.

Effective utilization of relatively high energy density and low cost anode metals such as magnesium, calcium, aluminum and the like has been hindered by the propensity of such metals to form highly adherent salt or oxide films on their surfaces. Because of their polyvalent nature the salts or oxides of such metals are highly stable and not easily removed in contrast to salts or oxides of monovalent metals such as lithium and the other alkali metals. The film layers introduce a high degree of polarization of the metal anodes, particularly at high discharge rates. Voltages of cells containing the polyvalent film forming anodes accordingly suffer and drop to generally unacceptable levels.

The adherent films however do serve a positive function in providing for simplification and reduced cost in the handling of the polyvalent metals since they protect such metals from being corroded or adversely affected by ambient conditions.

It is an object of the present invention to provide electrochemical cells contaning polyvalent film forming metal anodes having improved discharge characteristics.

This and other objects, features and advantages of the present invention will become more evident from the following discussion.

Generally the present invention comprises an electrochemical cell containing a polyvalent film forming metal anode, a nucleophilic electrolyte solvent and a carbon halide compound dissolved within said electrolyte solvent and having halide radical formation characteristics.

The polyvalent film forming metals and alloys of such metals of the present invention are those metals above hydrogen in the EMF series which thereby provide relatively high voltages. However such metals displace hydrogen in water and as a result are utilized more effectively in non-aqueous electrolyte cells. Examples of the most preferred polyvalent film forming metals include magnesium, calcium and aluminum having valences of +2, +2 and +3 respectively. Such metals form protective oxide films when exposed to the ambient atmosphere and various other films such as halides, carbonates, and the like when exposed to various electrolyte solvents and electrolyte salts. It has been discovered that the polarization effects of such protective films may be reduced by utilizing nucleophilic electrolyte solvents containing small amounts of carbon halides therein in conjunction with the polyvalent film forming metal anodes.

It is postulated that the carbon halide additive and the nucleophilic solvent operate in tandem to oxidize and remove additional metal from the anode during cell reaction thereby facilitating such cell reaction and increasing the cell potential. It is further postulated that increased cell potential is obtained without substantial disruption of the metal film in contrast to the operation of monovalent metal anodes such as lithium wherein the anode film is sloughed off during cell discharge. The carbon halide additive should be able to provide free halogen radicals which are presumed to penetrate the film layer on the metal surface and thereafter individually bond with the metal atoms to form transitional metal halide having a positive charge. The bonding with the oxidation of the polyvalent metal thereby provides additional electrons for enhanced cell potential. The solvent, because of its nucleophilic character, extracts the positively charged transitional metal halide from the metal surface and complexes therewith. It is suggested that the polyvalence of the metal enables the metal to be both oxidized and removed from the metal surface. In contrast thereto, a monovalent anode metal would be expected to form an uncharged metal halide without solvent removal of the halide from the metal surface.

Since the carbon halide and the nucleophilic solvent remove the metal from the metal surface despite the protective film the amount of carbon halide should be minimized to prevent deleterious self discharge of the cell. Generally the carbon halide is present in the nucleophilic electrolyte solvent in effective amounts up to about a 1 molar solution. It is however preferred that the molarity of the carbon halide in the nucleophilic solvent be less than about 0.2 molar.

Generally, because of the above postulated mechanism it is preferred that the halogen in the carbon halide be chlorine. Chlorine has a smaller atomic size than either bromine or iodine whereby it can penetrate the metal film more readily and carbon chlorides form free radicals more freely than the carbon fluorides.

Since radical formation is believed to provide the improvement of the present invention carbon halide compounds more susceptible to such radical formation are accordingly preferred. Polyhalogenated carbon compounds require lesser energies in the formation of free radical halogens and are thus preferred. Also preferred are smaller carbon halide compounds because of the reduced incidence of large chain formation which may interfere with cell conductivity and cell reactions. Additionally the smaller carbon halide compounds have a greater solubility in the nucleophilic solvents. In accordance with the above criteria the most preferred carbon halide is carbon tetrachloride ($CCl_4$). Other preferred carbon halides include chloroform ($CCl_3H$), methylene chloride ($CCl_2H_2$), carbon tetrabromide ($CBr_4$), hexachlorobenzene ($C_6Cl_6$) and methyl chloride ($CClH_3$).

The non-aqueous nucleophilic electrolyte solvents utilized in the present invention are generally those solvents having dipole moments and which are considered as being polar. Generally the greater the dipole moment of the solvent the greater will be its ability to remove the transitional positively charged metal halides from the anode metal surface with such solvents being accordingly preferred. Examples of preferred nucleophilic solvents generally considered useful in electrochemical cells include nitrile and amide solvents such as acetonitrile and N,N-dimethyl formamide. Other polar solvents include tetrahydrofuran, dimethyl sulfite, dimethyl sulfoxide, N-nitrosodimethylamine, gamma-butyrolactone, methyl formate, butyl formate, dimethoxyethane, dimethyl carbonate and propylene carbonate.

Electrolyte salts generally utilized in non-aqueous electrolyte cells include alkali, alkaline earth metal and aluminum salts such as perchlorates, tetrachloroaluminates, halides, hexafluorophosphates, hexafluoroarsenates and clovoborates. Lithium salts are most generally utilized and include $LiBF_4$, $LiPF_6$, $LiCl$, $LiAsF_6$, $LiNO_3$ and $LiClO_4$.

Examples of cathodes commonly used in non-aqueous electrolyte cells include metal chromates, dichromates, oxides, halides, permanganates, arsenates, periodates, vanadates, persulfates, sulfites, halogens, chalcogens, chalcogenides and mixtures thereof.

The following examples are set forth as further indicating the efficacy of the present invention in improving the voltage and polarization characteristics of cells containing polyvalent film forming anodes. The examples are set forth primarily for illustrative purposes and any specifics contained therein should not be considered as limitations on the present invention.

EXAMPLE I (Prior Art)

A conventional H-cell is constructed with a magnesium rod anode of 1.3 cm$^2$ area, a 1 molar $LiBF_4$-N,N-dimethylformamide (DMF) electrolyte solution, a silver/silver chloride (Ag/AgCl) reference electrode and a nickel cathode. The anodic polarization of the cell is measured galvanostatically with the potential being measured against current densities between open circuit and 10 mA/cm$^2$. The potential on open circuit (OCV) is about $-1.62$ volts vs. Ag/AgCl. The potentials at 1 and 10 mA/cm$^2$ are about $-1.33$ and $-1.25$ volts respectively.

EXAMPLE II

A cell is made in accordance with Example I but with a sufficient amount of carbon tetrachloride ($CCl_4$) added therein to provide a 0.1 molar solution of $CCl_4$ in DMF. The anodic polarization is measured as in Example I with the OCV being $-1.81$ volts. The potentials at 1 and 10 mA/cm$^2$ are about $-1.77$ and $-1.45$ volts respectively.

EXAMPLE III

A cell is made in accordance with Example II but with a 1 molar solution of $CCl_4$ in DMF. The anodic polarization of the cell is measured with the potentials at 1 and 10 mA/cm$^2$ being about $-1.72$ and $-1.36$ respectively.

EXAMPLE IV (Prior Art)

A cell is constructed as in Example I but with a 1 molar $LiPF_6$-DMF electrolyte solution. The anodic polarization is measured as before with the OCV being about $-0.91$ volts. The potentials at 1 and 10 mA/cm$^2$ are about $-0.86$ and $0.70$ volts respectively.

EXAMPLE V

A cell is constructed as in Example IV but with the addition of sufficient $CCl_4$ to make a 0.1 molar solution of $CCl_4$ in DMF. The anodic polarization is again measured with the potentials at 1 and 10 mA/cm$^2$ being about $-0.97$ and $-0.80$ volts respectively.

EXAMPLE VI

A cell is constructed as in Example V but with a 1 molar solution of $CCl_4$ in DMF. The anodic polarization is measured with the OCV being about $-1.75$ volts. The potentials at 1 and 10 mA/cm$^2$ are about $-1.73$ and $-1.42$ volts respectively.

EXAMPLE VII (Prior Art)

A cell is constructed as in Example I but with a calcium rod of 1.25 cm$^2$ area and a 1 molar $LiPF_6$-DMF solution electrolyte. The anodic polarization is measured as in the previous examples with the potentials at 1 and 10 mA/cm$^2$ being about $-1.90$ and $-1.74$ volts respectively.

EXAMPLE VIII

A cell is made in accordance with Example VII and additionally contains sufficient $CCl_4$ therein to make a 0.1 molar solution of $CCl_4$ in DMF. The anodic polarization is measured as above with the potentials at 1 and 10 mA/cm$^2$ being about $-2.28$ and $-2.00$ volts respectively.

EXAMPLE IX

A cell is made in accordance with Example VIII but with a 1 molar solution of $CCl_4$ in DMF. The anodic polarization is measured as above with the potentials at 1 and 10 mA/cm$^2$ being about $-2.36$ and $-2.08$ volts respectively.

From the above examples it is clearly evident that the addition of the carbon halide compound decreases the polarization of the cells as indicated by the improved voltages. It is however understood that the above examples are presented for demonstrating the efficacy of the present invention. Changes in cell structure and components as well as other modifications are possible without departing from the scope of the present invention as defined in the following claims.

What is claimed is:

1. An electrochemical cell comprising an anode comprised of a polyvalent film forming metal above hydrogen in the EMF series, an electrolyte salt, a non-aqueous nucleophilic electrolyte solvent and a carbon halide compound within said solvent and providing a solution of not more than 1 molar therewith.

2. The cell of claim 1 wherein said carbon halide compound is a carbon chloride.

3. The cell of claim 2 wherein said carbon chloride is selected from the group consisting of carbon tetrachloride, chloroform, methylene chloride, benzene hexachloride and methyl chloride.

4. The cell of claim 3 wherein said carbon chloride is carbon tetrachloride.

5. The cell of claim 4 wherein said solution has a molarity of less than 0.2 molar.

6. The cell of claim 1 wherein said polyvalent film forming metal is selected from the group consisting of magnesium, calcium and aluminum.

7. The cell of claim 6 wherein said polyvalent film forming metal is magnesium.

8. The cell of claim 1 wherein said non-aqueous nucleophilic electrolyte solvent is selected from the group consisting of acetonitrile and N,N-dimethyl formamide, tetrahydrofuran, dimethyl sulfite, dimethyl sulfoxide, N-nitrosodimethylamine, gamma-butyrolactone, methyl formate, butyl formate, dimethoxyethane, dimethyl carbonate and propylene carbonate.

9. The cell of claim 8 wherein said solvent is N,N-dimethyl formamide.

10. An electrochemical cell comprising an anode comprised of a member of the group consisting of magnesium, calcium and aluminum, an electrolyte salt, a non-aqueous nucleophilic electrolyte solvent and carbon tetrachloride within said solvent and providing a solution of not more than 1 molar therewith.

* * * * *